United States Patent

Rogers et al.

[11] Patent Number: 5,658,486
[45] Date of Patent: Aug. 19, 1997

[54] METHOD AND APPARATUS FOR PRODUCING DUST CONTROL SOLUTION

[76] Inventors: Larry D. Rogers, 1516 E. Robinson, Carson City, Nev. 89701; Frank Victor Rueckl, 665 Skyline Blvd., Reno, Nev. 89503

[21] Appl. No.: 449,937

[22] Filed: May 25, 1995

[51] Int. Cl.[6] .............................. C09K 3/22; B01F 17/00
[52] U.S. Cl. .............................. 252/88.1; 426/656
[58] Field of Search .............................. 252/88; 426/89, 426/656

[56] References Cited

U.S. PATENT DOCUMENTS

| | | |
|---|---|---|
| 2,583,684 | 1/1952 | Christensen . |
| 2,842,495 | 7/1958 | Morway et al. . |
| 3,030,211 | 4/1962 | McDonald . |
| 4,355,137 | 10/1982 | Winter ................................ 210/731 |
| 4,645,831 | 2/1987 | Lawhon ................................ 426/656 |
| 5,274,079 | 12/1993 | Katayama et al. ................. 426/656 |
| 5,366,661 | 11/1994 | Katayama et al. ................. 426/656 |

OTHER PUBLICATIONS

The Merck Index, Tenth Edition, Windholz et al, Merck & Co., Inc. 1983, p. 635, Article 4298 and p. 642 Article Gluten 437.

*Primary Examiner*—Margaret Medley
*Attorney, Agent, or Firm*—Herbert C. Schulze

[57] ABSTRACT

A method for production, and the resulting material thereof for a non-petroleum based stabilization solution utilizing mixtures of metallic hydroxides of endo-sperm of cereal flowers of cereals properly dissolved in water.

1 Claim, 2 Drawing Sheets

FIG. 1

PROCESS

STEP 1

ADD 20 GRAMS OF
GLIADIN GLUTEWIN
COMPOUND POWDER TO
1 LITER OF $H_2O$
MIX

STEP 2

DISSOLVE 1/2 DRY WEIGHT
OF GLIADIN GLUTEWIN
COMPOUND OF NaOH
(SODIUM HYDROXIDE)
10 GRAMS IN 1 LITER OF $H_2O$

STEP 3

MIX THE TWO
LIQUIDS FROM
STEPS 1 AND 2
IONIZATION OCCURS
IN 1 TO 2 MINUTES

METHOD AND APPARATUS FOR PRODUCING DUST CONTROL SOLUTION

BACKGROUND OF THE INVENTION

I. FIELD OF THE INVENTION

This is a method and apparatus for producing a fluid solution for dust control, soil based stabilization, and the like;

The invention is even more directly related to a fluid which is non-toxic and free of petroleum or petroleum based compounds;

The invention is even more directly related to the production and use of material utilizing hydrated endo sperm technology for environmental and other purposes as will be more completely described within this patent application.

II. DESCRIPTION OF THE PRIOR ART

Fluids have been used in the past for dust control. Such materials being either water alone or generally petroleum based mixtures for controlling dust, soil stabilization, and the like.

I know of no prior art wherein a hydrated endo sperm technology is used, which is the basis of this invention.

SUMMARY OF THE INVENTION

For environmental, and many other reasons, there is great attention being paid today to dust control, stabilization of top soil, entrusting powder or heavy aggregate dusting problems, tackifier moisture control, seeding applications, and the like.

Most commonly used materials, until now, have been petroleum based mixtures with water and the like. Such mixtures have obvious disadvantages.

Magnesium, chloride and calcium chloride are also widely used as dust control components, but these also have environmental disadvantages.

I have now developed a new material, which I sometimes refer to as "water-oil", which actually appears and feels like a highly refined and clean motor oil. However, there is no petroleum or petroleum based compound used.

In the material I have developed, the solution is a sodium endo sperm hydrate. The liquid has a boiling point of 215 degrees fahrenheit and is soluble in water.

The material is used for all of the purposes listed above and numerous other purposes including: dust control agent; chemical soil compaction compound; cement form-releasing agent; paper and wood mulch wetting agent; lubricant; drilling fluid; coal dust liquidation; pushing compound oil drilling; fire fighting agent; tackifier for seeds; binder for solid fuels, and probably others which have not been listed.

It is an object of this invention to provide a dust control solution which is water soluble and does not have any petroleum compounds;

Another object of this invention is to provide such material as has been described which can be used with no special equipment;

Another object of this invention is to provide a method for manufacturing the material which has been described.

The foregoing and other objects and advantages will become apparent to those skilled in the art upon reading the following specification, in conjunction with a review of the appended drawings.

BRIEF DESCRIPTION OF THE DRAWINGS

FIG. 1 is a block diagram illustration of the steps required to produce a solution of this invention.

DESCRIPTION OF A PREFERRED EMBODIMENT

Figure 2:
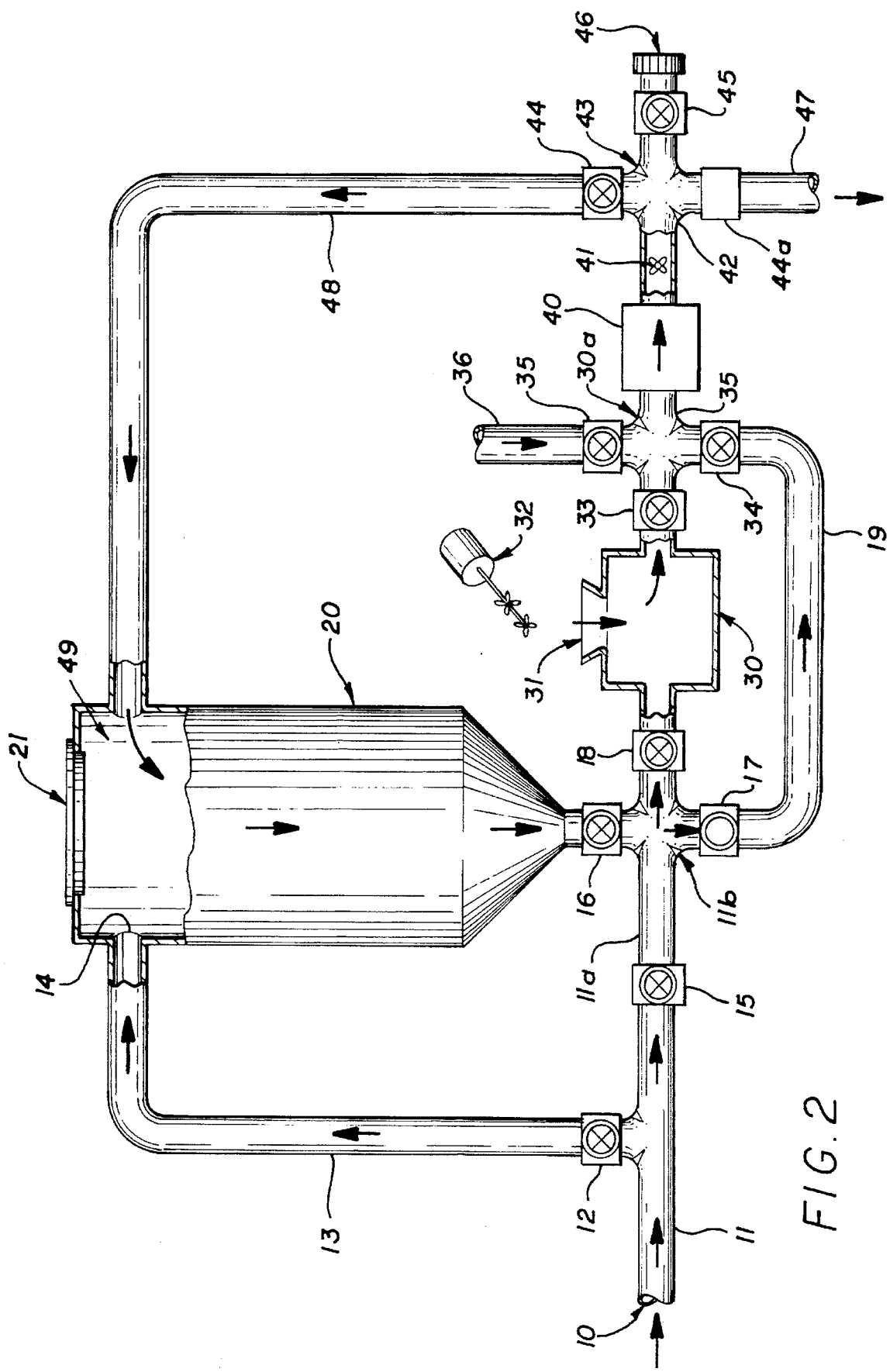
FIG. 2 is a partially sectioned, partially broken away, schematic illustration of a mechanism suitable to perform the method of producing the fluid of this invention.

FIG. 1 illustrates the basic process of creating the fluid of this invention. In Step 1 it is described that approximately 20 grams of gliadin and glutenin compound powder (these two proteins are derived from endo sperm of cereal flowers as is known to those skilled in the art) is added to 1 liter of water and it is mixed. At this point the gliadin glutenin compound will not be dissolved, but will merely be in suspension within the water.

Step 2 is now necessary in order to create the actual solution. At this point continuous mixing occurs and about one half (by weight) of the dry gliadin glutenin compound sodium hydroxide is added.

At Step 3 the mixing then continues until the ionizing reaction is complete (a period of one to very few minutes), at which time the solution which is the subject of this invention is now completely created.

It must be noted that sodium hydroxide has been specified. However, calcium hydroxide or potassium hydroxide (and perhaps other materials) can also be used.

FIG. 2 illustrates a preferred mechanism for producing the material which is the subject of this invention.

Before the start of a mixing cycle, all valves shown in FIG. 2 will be closed. There is indicated a pipe 11 directed to a water supply 10.

To start a mixing cycle, valve 12 will be opened. Water will then flow through conduit 13 to entry 14 into holding tank 20.

When the desired amount of water is in the holding tank, valve 12 will be closed. Valves 16, 18, 33 and 44 will be opened. Pump 40 will be activated, and the water is drawn through the premixing tank 30, tee fitting 35, spiral blade mixer 41 within conduit 42, 43, tee fitting through conduit 48 and inlet 49 into the holding tank 20.

During the operation just described the gliadin glutenin powder will be added to the premix tank through opening 31. At this time, a mixer 32 will be inserted through opening 31, and the powder will be mixed into suspension in the water. The flow of the powder in suspension will continue.

Now, the hydroxide will be added through the opening 31, and may be mixed in a like manner to that heretofore described with reference to the powder. When this is completed, in a short time (1, or a few, minute(s)) the solution is complete.

At this stage, the valve 44 may be closed and either valve 44a or valve 45 may be opened. If valve 44a is opened, the solution will be diverted to a second tank (not shown) to be held or to be diverted back into the system through conduit 36, through valve 35. Otherwise, at this stage, the valve 45 may be opened and the solution discharged through connector 46 to direct use, or to a transport tanker truck, or the like.

As shown in FIG. 2, when the solution is complete in holding tank 20, and all valves are closed, valves 16, 17, 34, and 45 (and, optionally 35) may be opened. When this occurs, the solution (and any additional solution through 36) will flow to use at 46.

As is indicated, the water supply also can continue on to Valve 15 for diversion through Conduit 11a into Tee-Connector 11b for diversion in two directions to Valve 18 or Valve 17.

Water containing the various solutions as will be, as here after described, allowed to flow from the Tank 20 through Valve 16 to mix with and flow with the water flowing through Valves 17 and 18. The water flows through Conduit 19 to Valve 34 and from there into the T-Connection 30*a*. While flowing from Valve 18 it will enter the mixing/re-mixing Tank A with the powder in Valve 31 where it will be mixed by a Mixer 32, which may be a portable mixer. After this mixing, the material may flow through Valve 33 into the T-Connection 30*a* and then be mixed with material coming from add on tank through Conduit 36. The material from T-Connection 30*a* will be pumped by Pump 40 through a spiral Blade Mixer 41 through Conduit 42 into T-Connector 43 where it may be diverted through Valve 44 and Conduit 48 into Tank 49 of the initial mixing of storage tank.

The material may be diverted through Conduit 47, or the like, to an add-on tank (not shown). After complete mixing the material will be flowing through Tank 40, Mixer 42 and out through Valve 45 on Exit 46 into the using entity, which may be to a spray gun, a tank, an aircraft, a tanker trucker, or the like.

While the embodiments of this invention shown and described are fully capable of achieving the objects and advantages desired, it must be understood such embodiments are for purposes of illustration only, and not for purposes of limitation.

I claim:

1. The method for producing a solution containing gliadin and glutenin comprising: introducing water into a mixing chamber; introducing gliadin, glutenin, and an hydroxide into said mixing chamber; agitating the mixture of gliadin, glutenin, hydroxide and water in the mixing chamber; pumping the mixture from the mixing chamber to a conduit; mixing the mixture in the conduit; passing the mixture from the conduit to the holding tank; passing the mixture from the holding tank to the mixing chamber; adding more water to the mixture in the mixing chamber; agitating the mixture with the added water; pumping the mixture with the added water to an exterior point of use of the mixture with the added water.

* * * * *